3,225,051
1,2,3,6-TETRAHYDROPYRIDINES
Rudolf Merten, Cologne-Flittard, Germany, assignor to Farbenfabriken Bayer Aktiengesellschaft, Leverkusen, Germany, a corporation of Germany
No Drawing. Filed Dec. 12, 1961, Ser. No. 158,905
Claims priority, application Germany, Dec. 19, 1960, F 32,789; Apr. 29, 1961, F 33,814; June 21, 1961, F 34,236
2 Claims. (Cl. 260—290)

This invention relates to the production of certain organic nitrogen bases by the hydrolyzing of compounds containing urethane groups which compounds are obtained by the condensation of (a) reaction products of carbamic acid esters with aldehydes or alkylidene diurethanes in the presence of acidic catalysts with (b) cationic polymerisable mono- and/or polyolefines and any unsaturated compounds that react as dienes during a Diels-Alder reaction in the presence of the above and/or other acidic catalysts. The production of such condensation products is described in U.S. patent application Serial No. 143,044, filed October 5, 1961.

In accordance with the present invention the novel organic nitrogen bases are defined by the formula

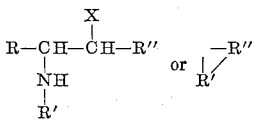

in which X is a member of the group consisting of hydrogen and alkyl, aryl and carbalkoxy radicals, R is a member of the group consisting of alkyl, cycloalkyl, aralkyl, aryl and a heterocyclic radical. Especially R may be a phenyl, o-tolyl, p-tolyl, p-chlorophenyl, o-chlorophenyl, 2,6-dichlorophenyl, 4-nitrophenyl, 2-acetoxyphenyl, hexyl, p-anisyl, p-aminophenyl, o-nitrophenyl, o-aminophenyl, cinnamyl, pyridyl, 2-methoxyphenyl, 2-acetoxyphenyl, isopropyl, 2-methoxy-3-hydroxy-phenyl or a benzoyl radical. R' is hydrogen, R" is a member of the group consisting of organic radicals represented by the formula

and R'—R" is represented by the formulae

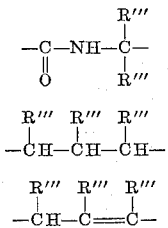

in which R''' is a member of the group consisting of the same or different hydrogen, halogen, alkyl, aralkyl, aryl alkoxy, and carbalkoxy radicals, wherein at least two radicals of the group R and R''' are other than hydrogen and two radicals of the group R''' may be linked together through a polymethylene chain.

According to the hydrolyzing conditions used, there can be obtained from urethane derivatives of 1,3-diamines, such as are obtained, for example, by the reaction of mono-olefins with alkylidene-diurethanes according to the reaction scheme given below, besides the corresponding amines I also the cyclic ureas II derived therefrom. Cyclic urethane derivatives III, such as can be obtained, for example, by the reaction of conjugated diolefines with alkylidene-diurethanes according to the above method, are converted by this hydrolyzing reaction into the amines IV. These reactions are reproduced substantially by the following reaction scheme:

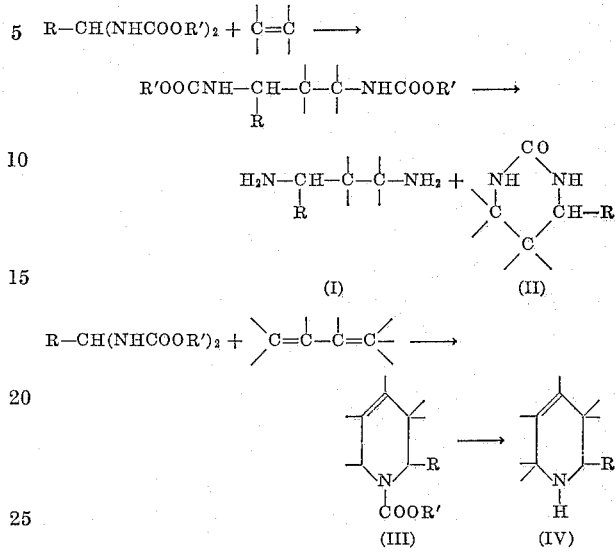

The starting materials which come into consideration for the process of the present invention, i.e. the above-defined condensation products, can be obtained by the methods of U.S. patent application, Serial No. 143,044, filed October 5, 1961.

Suitable aldehydes which serve as starting materials for the production of the above-mentioned condensation products are optionally mono- or poly-functional, possibly substituted, aliphatic, cycloaliphatic, aromatic or heterocyclic types. As examples therefor, there may be mentioned: formaldhehyde or formaldehyde-yielding substances, such as, for example, trioxymethylene, paraformaldehyde, acetaldehyde, chloroacetaldehyde, trichloroacetaldehyde, propionaldehyde, 3-chloropropionaldehyde, butyraldehyde, isobutyraldehyde, oenanthaldehyde, stearyl aldehyde, glyoxal, benzaldehyde, alkyl-substituted benzaldehydes, such as p-methyl-benzaldehyde, methoxybenzaldehydes, such as anisaldehyde, halogenated benzaldehydes, such as 4-chloro- or 2,6-dichlorobenzaldehyde, nitrobenzaldehydes, such as p-nitrobenzaldehyde, benzaldehyde-sulphonic acids, such as benzaldehyde-4-sulphonic acid, hydrogenated benzaldehydes, such as 4-methyl-hexahydrobenzaldehyde, terephthalaldehyde, naphthaldehyde, phenyl-acetaldehyde, acrolein, crotonaldehyde, cinnamyl aldehyde, dialkylaminoacetaldehydes, dialkylaminobenzaldheydes, dimethylaminomethyl-benzaldehydes, pyridine-2-, pyridine-3- or pyridine -4-aldehyde or their substitution products, quiniline aldehydes, isoquinoline aldehydes, N-alkyl-indolaldehydes, furfurol, thiophenealdehyde, etc. Not only basic but also non-basic aldehydes can here be used, whereby, in the case of basic aldehydes, these are reacted in the form of their salts with regard to the basic grouping.

As carbamic acid esters for the production of the starting materials are included any desired esters of unsubstituted carbamic acid of the general formula

$$H_2N \cdot COO-R'$$

whereby R' is any desired organic residue. As examples there may be mentioned: carbamic acid methyl ester, ethyl ester, propyl ester, butyl ester, isobutyl ester, hexyl ester, allyl ester, crotyl ester, benzyl ester, furfuryl ester, β-chloroethyl ester, β-dimethylaminoethyl ester, etc., whereby polyfunctional alcohols, such as ethylene glycol, butandio-1,4, glycerol or trimethylol-propane, can be substituted wholly or partially for the production of the carbamic acid esters, for example, via a reaction of urea with the alcohol in question, a reaction of the corresponding chlorocarbonic acid ester with ammonia or by the partial aminolysis of a corresponding carbonic acid diester with ammonia.

As olefines for the production of the condensation products to be used within the meaning of the present invention, there can be used any desired mono- or polyolefines which are accessible to a cationic polymerisation. By way of example there may be mentioned straight chain or branched aliphatic olefines with 2–18 carbon atoms, such as ethylene, propylene, butylene, isobutylene, di-isobutylene or tri-isobutylene, cycloaliphatic types, such as vinyl-cyclohexane, aromatic substituted olefines, such as styrene, nuclear- or side chain-halogenated styrenes, nuclear- or side chain-alkylated styrenes, such as α-methyl-styrene, vinyl-pyridines, vinyl-quinolines, vinyl ethers, such as, for example, vinyl methyl ether, vinyl ethyl ether or vinyl butyl ether, as well as poly-olefines, such as butadiene-1,3, isoprene, 2,3-dimethyl-butadiene, pentadiene, chloroprene, 2,3-dichloro-butadiene, 2-phenyl-butadiene, cyclopentadiene or dicyclo-pentadiene, 2-ethoxy-3-methyl-butadiene, 1-cyanobutadiene, 2-cyanobutadiene, sorbic acid, vinyl-cyclohexene or divinyl-benzene.

It is possible to employ as olefins during the preparation of the addition compounds to be saponified all those unsaturated compounds which can be used as dienes. Suitable examples of these compounds are given, for instance, in "Neuere Methoden der präparativen organischen chemie I (1943), pages 251–358, "Chem. Reviews" 31 (1942), page 319 et seq., etc. Among the large number of compounds there specified and also among the compounds described more recently and reacting as dienes, there may be mentioned: diene-hydrocarbons with a 1,3-diene structure, provided that they do not form the subject of the main patent owing to their polymerisability with cationic initiators, such as α-phelladrene, 1,1'-bicyclohexenyl, 1,1'-bicyclopentenyl, 1,1'-bicyclobutenyl, 1-isopropenyl-cyclohexene, as well as their benzo-derivatives, etc., these being available, e.g., according to Ž. obšč. chim. 30 (1960) 2141–2145 and previous papers by mixed pinacoline reduction of ketones with aluminium amalgam and subsequent dehydration, 1,2-dimethylene-cycloalkanes and also their endo-substituted or/and halogenated forms, e.g. according to British patent specification 796,133, British patent specification 796,135, J. Chem. Soc. 1960, pages 1541–1547, German specification 1,090,204, etc., and in addition also dienes such as furans, alkylfurans, cyclopentadienones, α,α',β,β'-benzofuran. The diene system may also contain a hetero atom as a constituent, as is the case, e.g., in acrolein, vinyl-methyl ketone, o-methylene-cyclohexanone, o-quinone-methidene, 2,2'-bis-3-indolonyl (dehydro-indigo), and others. A further group of systems reacting as dienes is derived from the class of the polycyclic systems, which can be converted to higher conjugated systems, usually of an aromatic character, during the addition reaction. As examples there may be mentioned anthracene, alkyl and/or aryl substituted anthracenes, 2,3-benzanthracene, pentacene, methylcholanthrene, naphtho-2',3',3,4-pyrene, 1,9,5,10-di-(perinaphthylene)-anthracene, 7,7' - dimethyl - (naphtho - 2',3',1,2-anthracene), and others, also of thebaine, dihydropyridine, as well as of natural compounds such as derivatives of abietic acid, ergo sterines, etc.

The olefines used preferably contain agents stabilizing them against radical polymerisation, such as, for example, hydroquinone, phenothiazine, tert.-butyl-pyrocatechol and the like.

The alkylidene urethanes necessary for the production of the starting materials are produced in known manner (cf. Houben-Weyl, "Methoden der organischen Chemie," 7/1 (1954), page 481; 8 (1952), page 147) by the condensation of 2 mol of a carbamic acid ester with 1 mol of an aldehyde in an acidic medium. As acidic catalysts there come into consideration the substances mentioned in the following for the further condensation with olefines as well as any other desired acids, such as, for example, boric acid, acetic acid, hydrochloric acid, and the like.

Furthermore, there can also be used for the present process condensation products which are obtained by the condensation under other molar ratios of the components, i.e. particularly those ratios between 1:1 to 1:2 for aldehyde to carbamic acid ester.

These condensations can be placed immediately before the subsequent reaction with the olefine. In this case, the removal of the water formed is carried out, for example, by simple distillation or, preferably, by azeotropic distillation, for example, with the aid of a solvent, such as aliphatic hydrocarbons, cyclohexane or aromatics, etc.

Of course, alkylidene diurethanes produced in other ways can also be used for carrying out the present invention.

The production of the urethanes to be saponified takes place by the reaction of the alkylidene urethanes with the olefines in the presence of acidic catalysts, such as are known for the carrying out of Friedel-Crafts reactions. As examples there should be mentioned here: anhydrous organic and inorganic acids, such as sulphuric acid, phosphoric acid, perchloric acid, hydrogen halides, fluorosulphonic acid, chlorosulphonic acid, trichloroacetic acid, methane-sulphonic acid, toluene sulphonic acids, technical sulphonic acid mixtures of an aliphatic or aromatic nature, such as for example, sulphonic acid-group containing long-chain paraffins with 10–18 carbon atoms, sulphonated polymers based on polystyrene, possibly cross-linked with polyvinyl compounds, or phenol-formaldehyde condensates; furthermore, anhydrous metallic or non-metallic halides functioning as Lewis acids, such as boron trifluoride and its adducts with ether, acetic acid, etc., boron trichloride, phosphorus halides, phosphorus oxyhalides, aluminum chloride, zinc chloride, stannous and stannic chloride, ferric chloride, antimonic chloride, chromic chloride, and the like.

The proportions in the reaction of the olefines with the possibly intermediate formed alkylidene urethanes are widely variable. In the case of using equimolar amounts of alkylidene urethane and olefine, 1:1 adducts can hereby be obtained; however, in the case of using an excess of olefine also adducts with a higher proportion of olefine, while the use of excess alkylidene urethane is merely of interest for the complete conversion of the olefine used. Preferably there come into consideration ratios of the components which correspond to 1–10 equivalents of olefine per mol of alkylidene urethane grouping.

The amount of catalyst can also vary within wide limits, an upper limit being given by economic reasons, as well as, under circumstances, by difficulties arising in working up; normally, between 1 and 100 percent by weight will be used but, nevertheless, the nature of the catalyst, of the reaction components, as well as the amount and nature of the solvent which may possibly be used, play an important part. In the case of using basic starting materials, these must be employed in the form of their salts. This is achieved most simply in that by the reaction, possibly even by the production of the alkylidene urethanes, at least one equivalent of an acidic substance, preferably from the group of the catalysts mentioned, is added per equivalent of the basic compound.

For the carrying out of the addition reaction, the alkylidene urethane, which can also be produced directly in a previous operation in anhydrous form in the presence of an acidic catalyst for subsequent use or also in a weak acid, is present normally under the most anhydrous conditions possible. In this case, the most varied, preferably nonpolar solvents, such as aliphatic hydrocarbons, benzene, toluene, xylene, cyclohexane and the like, can be added. After the addition of the catalyst, the olefine is then added, whereby in the case of low boiling olefines one can also work under pressure, preferably under the actual pressure of the olefine used. After the addition of the olefine, the addition is carried out to the end, possibly at an elevated temperature, whereby the alteration of the refractive index, for example, is used for the control of the course of the reaction. As temperatures for the addition of the olefine and the post-reaction periods, there generally come into question temperatures between −40° C. and +180° C., the reactivity of the components being of important influence. On the other hand, the nature of the addition can also be varied in that, for example, the diurethane and the olefine can be added dropwise to the catalyst or, in less reactive cases, the catalyst can also be added dropwise to the reaction mixture; however, in all cases, the direct prior contact between the olefine and the acidic catalyst is to be avoided. The working up of the addition products takes place in known manner in that, for example, after removal of the acidic catalyst, unreacted starting substances and by-products are washed out or removed by distillation.

In the addition step it is, of course, possible, to use instead of the individual definite olefines, aldehyde, carbamic acid esters or catalysts, also mixtures thereof.

The so-obtained addition products are obtained in high yields and are liquid or solid, generally well soluble products. As by-products there can appear in minor amounts dimeric olefines, cyclic condensates of olefine and aldehyde with m-dioxan structure or also Friedel-Crafts adducts.

According to the process of the present invention, the condensation products obtained in the above-described manner from (a) reaction products produced from carbamic acid esters with aldehydes in the presence of acidic catalysts or alkylidene diurethanes and (b) cationic polymerisable mono- and/or polyolefines in the presence of the above and/or other acidic catalysts, are subjected to a saponification reaction. The carrying out of the saponification can take place at any desired pH value, not only in alkaline but also in neutral and acidic medium.

As saponification agents there can be used, for example, the most varied basic substances, such as, for example, alkali metal hydroxides, such as LiOH, NaOH, KOH, alkaline earth metal oxides, such as $Ca(OH)_2$, MgO, $MgCO_3$, $Ba(OH)_2$, as well as $K_2CO_3$, $NH_3$ or $NH_4OH$ and the like. Furthermore, it is also possible to use strong organic bases, such as, for example, quaternary ammonium bases, such as benzy-trimethyl ammonium hydroxide and tertiary sulphonium bases. Fundamentally, any desired large amounts of these bases can be used but preferably amounts of about 0.1–3 mol equivalents of base per urethane grouping come into consideration.

In the case of acidic saponification, there are possibly only used catalytic amounts of any desired acid, preferably, however, at least an amount of acid equivalent to the theoretically expected amount of amine. Examples of acids which are suitable for this saponification reaction are HCl, HBr, $H_2SO_4$ $H_3PO_4$, $H_3BO_3$, as well as strongly acidic and also weakly acidic (sulphonic acid or carboxylic acid group-containing ion exchangers), carbon dioxide, as well as organic acids, such as, for example, acetic acid, trichloroacetic acid, p-toluene-sulphonic acid, benzene-sulphonic acid and the like.

Furthermore, it is also possible to effect the saponification in a neutral medium, for example with water at elevated temperatures, i.e. 100–250° C., under pressure.

The reaction medium can be of an aqueous or alcoholic as well as of an aqueous-alcoholic nature. As alcoholic reaction media there may be mentioned methanol, ethanol, glycol, glycol monobutyl ether (Cellosolve) or their aqueous mixtures.

The carrying out of the saponification can take place at temperatures between, for example, 50 and 250° C., whereby for the production of 1,3-diamines from 1,3-diurethanes, which can be converted into cyclic ureas, temperatures over 200° C. and alkaline saponification conditions have proved to be expedient for the avoidance of this urea formation. At lower temperatures and/or acidic saponification conditions, the equilibrium is displaced in favour of larger amounts of urea. The time for the saponification depends on the temperature and reaction medium; it preferably lies between 1 and 20 hours. According to a preferred embodiment of the present invention, it is also possible previously to subject the products to be saponified to a modification. For example, nitro groups can be reduced and carbon-carbon double bonds can be saturated by hydrogenation.

After carrying out the saponification, which can possibly be carried out under pressure, the amine obtained can either be separated directly from the basic reaction solution, for example, by extraction with solvents, such as aromatic, aliphatic, cycloaliphatic or halogenated hydrocarbons or ethers, and distilled. On the other hand, it is also possible first to purify the amine via an intermediate salt formation or, according to the properties, to isolate it directly as crude salt with the help of the most varied acids, such as HCl, $H_2SO_4$, $HClO_2$ or picric acid. Acidic reaction solutions are preferably first freed from impurities soluble in organic solvents, such as benzene, by extraction and the reaction product, after alkaline adjustment of the reaction solution, isolated as free amine or isolated as amine salt from acidic solution.

The amines obtainable according to the process of the present invention are suitable in the form of their salts as emulsifiers or dispersing agents. The primary amines obtained by this process or the polyamines derived from these amines can also serve as intermediates for the production of the most varied products, for example, for the production of polyisocyanates, while the pyridine derivatives obtained with conjugated diolefines can be used as intermediates for the production of piperidine or pyridine derivatives.

The inventively obtained compounds are insecticides and show a good activity, whereas their mammal toxicity is low. They therefore may be applied for the combating of insects, especially for the combating of flies and mosquito larvae. Some insecticidal values are to be seen from the following table:

| Compound | Musca domestica | | Blatta or. (cockroaches) | | Aedes aegypti | |
|---|---|---|---|---|---|---|
| | Conc., percent | TL 95, sec. | Conc., percent | Killed in 24 hours, percent | Conc., percent | TL 95, sec. |
| (structure) | 0.1 | 45 | 0.1 | 100 | 0.1 | 60 |

Toxicity to mice ($LD_{50}$ subcutaneous): 80 to 100 mg./kg.

Toxicity to mice ($LD_{50}$ subcutaneous): 80 to 100 mg./kg. The above test results were obtained by the following method: Sheets of filter paper were saturated with 5 milliters of a solution of 0.1% by weight of the foregoing compound (2-phenyl-4-methyl-1,2,3,6-tetrahydropyridine whose preparation is described in Example 14 hereinafter) in acetone. After evaporation of the acetone the test animals were placed into petri dishes in which sheets of the filter paper thus impregnated with the compound had also been placed; the TL 95 value refers to the time required to kill 95% of the test animals.

The linear 1,3-diphenyl-1,3-diamino-propane of the following formula

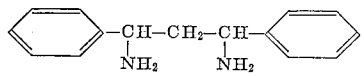

may be used as technical preservatives, as e.g. with glue, spinning preparations in synthetic fibres and perishable emulsifiers containing organic technical material. Thereby a concentration of about 1:200 is necessary.

The following examples illustrate the described process. The parts given are parts by weight insofar not otherwise stated.

*Example 1*

(a) 106 parts of benzaldehyde, 178 parts of carbamic acid ethyl ester, 2.5 parts of $BF_3$-etherate and 700 parts of benzene are heated to boiling under reflux until the azeotropic splitting off of water hereby effected with the help of a water trap is ended. A further 25 parts of $BF_3$-etherate are then added and, while excluding moisture, 104 parts of styrene added dropwise at 90° C. in the course of about 4 hours. A temperature of 90–120° C. is maintained for about 15 hours while a part of the benzene distills off, then the mixture allowed to cool, the acidic catalyst is washed out with dilute soda lye, the aqueous phase separated off and the organic phase is freed from liquid by-products, starting materials etc. by distillation at 160° C./0.1 mm. Hg. As residue there remain about 350 parts of the viscous, resin-like bis-urethane with 7.35% N (theoretical: 370 parts bis-urethane with 7.7% N).

(b) 350 parts of the bis-urethane obtained according to (a) are, after flushing with nitrogen, heated in an autoclave for 4 hours at 230° C. with 300 parts of ethanol and a solution of 215 parts solid KOH in 215 parts water or 430 parts of 50% technical KOH. After cooling, the amine is separated from the aqueous phase with about 200 parts of benzene. For the purposes of purification, the benzene phase is then again extracted with 25% hydrochloric acid and the amine subsequently separated out from the aqueous hydrochloric acid phase in the form of a viscous oil by the addition of alkali. The free amine is taken up with benzene and distilled in a vacuum. After small first runnings, there are obtained about 120 parts amine I with a boiling point of 140–170° C./0.1 mm. Hg, as well as 15 parts of higher, homologous amine II with a boiling point of 170–200° C./0.1 mm. Hg.

By redistillation of amine I, there is obtained 1,3-diphenyl-1,3-diamino-propane with a B.P. of 135° C./0.07 mm. Hg and a $n_D^{20}=1.5836$.

Calc. $C_{15}H_{18}N_2$: 79.6% C, 8.0% H, 12.4% N. Found: 79.4% C, 8.0% H, 12.5% N.

(c) 357 parts of the bis-urethane obtained according to 1(a) are melted and 280 parts KOH in 150 parts of water slowly introduced at about 100° C. With continuous distilling off of water and ethanol, it is heated to 250° C., maintained for 3 hours at 250° C. and the mixture of amine and lye then worked up in the manner described under 1(b). 80 parts of the amine mixture there described under I are thereby obtained.

(d) 4.5 parts of the diamine obtained according to 1(b) are concentrated on the water bath with excess conc. hydrochloric acid, stirred up several times with ethanol and finally recrystallized from ethanol/acetone. The bis-hydrochloride of 1,3-diphenyl-1,3-diamino-propane melts at about 340° C. with decomposition.

Calc. $C_{15}H_{20}N_2Cl_2$: 60.2% C, 6.7% H, 9.4% N, 23.7% Cl. Found: 60.0% C, 6.9% H, 9.4% N, 23.5% Cl.

(e) 100 parts of the diamine obtained according to 1(b) are dissolved in 500 parts of chlorobenzene and then added dropwise below 0° C. to a solution of 350 parts phosgene in 100 parts of chlorobenzene. A fine suspension is formed which becomes clear by heating to about 100° C. Phosgenation with 700 parts phosgene for a further 4 hours under reflux takes place, subsequently, phosgene expelled by nitrogen at an elevated temperature and the product distilled in a vacuum. The so-obtained 1,3-diphenyl-propane-1,3-diisocyanate boils at 150–155° C./0.05–0.07 mm. Hg, $n_D^{20}=1.5650$.

Calc. $C_{17}H_{14}N_2O_2$: 73.4% C, 5.1% H, 11.5% O, 10.1% N. Found: 73.8% C, 5.3% H, 11.2% O, 9.6% N, 0.4% Cl.

*Example 2*

74 parts of the condensation product obtained according to Example 1(a) are heated to boiling under reflux for 15 hours with 56 parts KOH and 300 parts n-butanol, the butanol is substantially removed in a vacuum and the residue taken up in half conc. hydrochloric acid. There remain behind I about 16 parts of an insoluble product which, after recrystallization from ethanol, melts at 265° C. and is 4,6-diphenyl-2-oxo-hexahydropyrimidine.

Calc. $C_{16}H_{16}N_2O$: 76.2% C, 6.4% H, 11.1% N, 6.3% O. Found: 76.3% C, 6.5% H, 11.2% N, 6.5% O.

The hydrochloric acid phase is rendered alkaline with KOH and, after being taken up with benzene, gives upon distillation 30 parts of the 1,3-diphenyl-1,3-diamino-propane described in Example 1(b). The urea I can similarly be converted into the above amine by saponification with KOH at 230° C.

*Example 3*

(a) 100 parts of paraformaldehyde, 450 parts of carbamic acid methyl ester, 10 parts of conc. sulphuric acid and 1000 parts of benzene are heated to boiling under reflux until the azeotropic splitting off of water hereby effected with the help of a water trap is ended. Subsequently, a further 50 parts of sulphuric acid are added and at 90° C. 312 parts of styrene added dropwise within 4 hours. The mixture is heated for 15 hours at 90–100° C., the acidic catalyst washed out with dilute alkali and there is obtained, upon concentration at 160° C./12 mm. Hg, a total of 689 parts of the corresponding diurethane with 9.8% N (calc. for 1:1 adduct: 10.5% N).

(b) 677 parts of the condensation product produced according to 3(a) are dissolved in 600 parts of ethanol and a solution of 650 parts KOH in 800 parts of water added. The mixture is heated for 4 hours at 230° C. and then worked up in the manner described under 1(b), whereby the amine is finally extracted with ether. The distillation gives 130 parts of a mixture of homologous amines at 70–96° C./0.2 mm. Hg with 73.9% C, 9.25% H, 14.5% N, while there is calculated for 1-phenyl-1,3-diaminopropane 72.0% C, 9.4% H and 18.7% N.

*Example 4*

200 parts of the addition product obtained according to Example 3(a) are dissolved in 300 parts of ethanol, 100 parts of water are added and heated for 4 hours at 230° C. in an autoclave pressurized to 60 ats. with $CO_2$. After cooling, about 70 parts of the 4-phenyl-2-oxo-hexahydropyrimidine are filtered off which, after recrystallization from ethanol, melts at 237–238° C.

Calc. $C_{10}H_{12}N_2O$: 68.2% C, 6.9% H, 15.9% N. Found: 68.1% C, 7.0% H, 15.9% N.

The filtrate is worked up in the manner described in Example 3(b) and gives about 40 parts of the homologous amine mixture described therein.

The saponification can also be carried out in the above-described manner with the use of 1% phosphoric acid as catalyst and leads to practically the same result.

*Example 5*

(a) 240 parts of p-tolyl aldehyde, 300 parts of carbamic acid methyl ester, 400 parts of benzene and 2 parts of $BF_3$-etherate are first converted in the manner described in Example 1(b), with 2 parts of $BF_3$-etherate into the alkylidene-bis-urethane and then, after the addition of a further 40 parts of $BF_3$-etherate, added at 90–100° C., to 208 parts of styrene. After analogous working up, there is obtained the addition product in a yield of 550 parts.

Found: 70.4% C, 6.9% H, 7.1% N. Calc. for 1:1 adduct 67.9% C, 6.8% H and 7.9% N.

(b) 488 parts of the adduct produced as above are, after dissolving in 500 parts methanol, heated in an autoclave, together with 168 parts KOH and 450 parts of water, for 10 hours at 240° C. and the reaction mixture acidified after cooling. Thereby precipitate out I 37 parts of the cyclic urea. The 4-phenyl-6-p-tolyl-2-oxohexahydropyrimidine is recrystallized from ethanol and melts at 234–235° C.

Calc. $C_{17}H_{18}N_2$: 76.6% C, 6.8% H, 10.5% N, 6.0% O. Found: 75.9% C, 7.0% H, 10.0% N, 6.1% O.

The acidic solution is subsequently rendered alkaline, taken up in benzene and distilled whereby II the 1-phenyl-3-p-tolyl-1,3-diamino-propane goes over at 164–165° C./0.1 mm. Hg with $n_D^{20}=1.5798$.

Calc. $C_{16}H_{20}N_2$: 79.9% C, 8.4% H, 11.7% N. Found: 79.9% C, 8.3% H, 11.5% N.

*Example 6*

650 parts of a crude bis-(N-carbethoxy)-diamine produced according to Example 5(a) with carbamic acid ethyl ester are dissolved in 600 parts of ethanol, 450 parts KOH in 600 parts of water added and, after flushing with nitrogen, heated for 4 hours at 230° C. As main fraction are obtained, after working up the amine in analogy to Example 1(a), 178 parts of the 1-phenyl-3-p-tolyl-1,3-diaminopropane described in more detail in Example 5(b) under II.

*Example 7*

(a) 178 parts of carbamic acid ethyl ester, 175 parts of 2,6-dichlorobenzaldehyde, 400 parts of benzene and 3 parts of $BF_3$-etherate are converted analogously to Example 1(a) into the alkylidene-diurethane and, after the addition of 20 parts of $BF_3$-etherate, added to 104 parts of styrene. With analogous working up, the crude bis-urethane with a yield of 380 parts is obtained.

Calc. for 1:1 adduct $C_{21}H_{24}N_2Cl_2O_4$: 57.5% C, 5.5% H, 6.4% N, 16.1% Cl, 14.6% O. Found: 57.6% C, 5.3% H, 5.6% N, 18.3% Cl.

(b) 200 parts of the addition product obtained according to Example 7(a) are heated to 230° C. with 300 parts of ethanol, 100 parts of water and 2 parts of phosphoric acid for 6 hours and a solid material filtered off from the reaction product. This was recrystallized from ethanol and gave 4-phenyl-6-(2′,6′-dichlorophenyl)-2-oxohexahydropyrimidine in a yield of 25 parts with an M.P. of 278–280° C.

Calc. $C_{16}H_{14}N_2OCl_2$: 8.7% N, 22.1% Cl. Found: 9.0% N, 21.6% Cl.

The filtrate of the cyclic urea is concentrated, whereby 117 parts of a non-crystallizing material are obtained which, according to the infra-red spectrum, is a linear amino-urea.

*Example 8*

380 parts of an addition product obtained according to Example 7(a) are heated for 4 hours at 230° C. with 500 parts of ethanol, 225 parts KOH and 400 parts of water, after cooling taken up with benzene and, after separation of the aqueous phase, extracted with half conc. hydrochloric acid. By concentration on the water bath and repeated trituration with ethanol, a semi-crystalline mass is obtained in an amount of 123 parts, the infra-red spectrum of which with regard to the functional groups is identical with the spectrum of the 1,3-diamino-1,3-diphenylpropane dihydrochloride obtained according to Example 1(d). The broadening of the bands at $13\mu$ indicates the vicinal tri-substituted aromatics. For a dihydrochloride of 1-phenyl-3-(2′,6′-dichlorophenyl)-1,3-diaminopropane there is calculated: $C_{15}H_{18}N_2Cl_4$: 7.6% N, 38.5% Cl. Found: 6.2% N, 28.1% Cl.

*Example 9*

(a) 228 parts of heptyl aldehyde, 356 parts of carbamic acid ethyl ester, 5 parts of $BF_3$-etherate and 800 parts of benzene are converted analogously to Example 1(a) into the alkylidene-diurethane and, after the addition of 50 parts of $BF_3$-etherate, this is added at 90° C. to 208 parts styrene. By analogous working up, 309 parts of the crude urethane are obtained with 73.2% C, 10.4% H, and 5.2% N, whereas there is calculated for a 1:1 adduct 66.6% C, 9.1% H and 7.4% N.

(b) 302 parts of the condensation product obtained according to (a) are dissolved in 300 parts of ethanol, 200 parts KOH in 200 parts of water are added and heated for 4 hours at 230° C. After distilling off the ethanol, the residue is extracted at a pH value of $>12$ with benzene and the benzene phase subjected to distillation. Thereby 88 parts of a crude amine go over with a boiling point of 120–180° C./0.1 mm. Hg which shows 4.4% nitrogen and a refractive index $n_D^{20}=1.4880$.

The infra-red spectrum of the distillate shows no difference in comparison with the spectrum of the diamine obtained according to Example 3(b) with regard to the position of the functional groups. The higher proportion of aliphatics appears very clearly in an accentuation of the aliphatic CH oscillations.

*Example 10*

(a) 280 parts of p-chlorobenzaldehyde, 356 parts of carbamic acid ethyl ester, 150 parts of a polystyrene sulphonic acid cross-linked with 2% divinyl-benzene and 800 parts of benzene are heated to boiling under reflux until the azeotropic splitting off of water hereby effected with the help of a water trap is ended and 208 parts of styrene then added dropwise at 80° C. The mixture is heated for 20 hours at 80–120° C. this temperature being reached by distilling off a corresponding amount of benzene. The acidic catalyst is removed by filtration and the crude urethane freed from solvents and liquid components by distillation up to 150° C./12 mm. Hg. There is obtained, in a yield of 620 parts, an addition product with 5.9% N and 10.85% Cl, while there is calculated for a pure 1:1 adduct 6.9% N and 8.8% Cl.

(b) 293 parts of the addition product produced as described above are dissolved in 300 parts of ethanol and heated for 4 hours at 230° C. in an autoclave together with 225 parts KOH and 300 parts of water. After taking up the reaction product in about 200 parts of benzene, the alkaline aqueous phase is separated off and the benzene phase extracted with half concentrated hydrochloric acid. Upon concentration of the hydrochloric acid phase, the hydrochloride, which is moderately soluble in water, precipitates out in the form of white crystals which melt at 302–306° C. The yield amounts to about 70%.

Calc. for 1-phenyl-3-p-chlorophenyl - 1,3-diaminopropane dihydrochloride $C_{15}H_{19}N_2Cl_3$: 8.4% N, 31.9% Cl. Found: 7.9% N, 30.0% Cl.

The infra-red spectrum is, with regard to the functional groups, practically identical with the spectrum of the dihydrochloride obtained according to Example 1(d). The p-substituted benzene nucleus appears additionally by the band at $12.05\mu$.

(c) By the saponification according to Example 10(b) with heating under reflux, there is obtained, with analogous working up, the there described dihydrochloride in a yield of about 30%. In addition, white needles are obtained in an amount of 30 parts which are 4-phenyl-6-(4'-chlorophenyl)-2-oxo-hexahydropyrimidine and are recrystallized from ethanol.

M.P. 249° C. Calc.: $C_{16}H_{15}N_2OCl$: 9.8% N, 12.4% Cl. Found: 9.9% N, 12.4% Cl.

*Example 11*

(a) 266 parts of benzal-diurethane and 60 parts of $BF_3$-etherate are mixed in 500 parts absolute benzene at 60° C. in the course of 4 hours with 520 parts of styrene and subsequently stirred for 10 hours at 60° C., whereby the refractive index alters from 1.5230 to 1.5285. The acidic catalyst is then washed out with sodium bicarbonate solution and the product freed from solvents and liquid components up to 120° C./0.1 mm. Hg. The crude urethane is thereby obtained in a yield of about 590 parts. The product shows a nitrogen content of 4.4% and an oxygen content of 9.8% which corresponds to the addition of an average of 3.8 mol styrene to 1 mol benzal-diurethane.

(b) 200 parts of the addition product described under (a) are heated for 6 hours at 230° C. with 300 parts of ethanol, 100 parts of water and 2 parts of phosphoric acid and the semi-solid mass then separated by filtration. The solid residue consists preponderantly of the 4,6-diphenyl-2-oxo-hexahydropyrimidine described in Example 2. Upon concentration, the filtrate yields 42 parts of a polymeric amine with 5.0% N which, according to the infrared spectrum, is substantially identical with the amine described in Example 1(b). Only the frequencies ascribable to the aromatic components are strengthened.

*Example 12*

(a) 177 parts of p-diethylaminobenzaldehyde, 178 parts of carbamic acid ethyl ester and 800 parts of benzene are treated dropwise at room temperature with 100 parts of conc. sulphuric acid and the mixture heated to boiling until the end of the azeotropic removal of water. A further 30 parts of conc. sulphuric acid are then added and 104 parts of styrene added dropwise at 80–90° C. The mixture is heated for 15 hours at 90–120° C. and then the acid present neutralised with dilute soda lye. The benzene phase is separated off at pH 7–8 and the crude condensate freed from volatile components up to 160° C./0.1 mm. Hg.

Found: 73.8% C, 7.7% H, 7.9% N. Calc. for 1:1 adduct—$C_{25}H_{35}N_3O_4$: 68.1% C, 8.0% H, 9.5% N.

(b) 295 parts of the adducts obtained as described above are heated for 4 hours at 230° C. with 350 parts of ethanol, 200 parts KOH and 200 parts of water, the ethanol distilled off and, after cooling, the aqueous phase shaken out with benzene. The benzene phase is then treated with half dilute HCl and the separated hydrochloride concentrated on the water bath. After repeated trituration with ethanol, the hydrochloride is obtained as a semi-solid mass in an amount of 150 parts. The infra-red spectrum of the hydrochloride shows, with regard to the functional groups, substantial similarity with the dihydrochloride obtained according to Example 1(d). The p-substituted aromatic nucleus is additionally recognizable by a band at 11.9μ. Due to the different nature of the amine salt groups, a clear split of the salt bands occurs in the region between 3 and 4μ.

*Example 13*

(a) 50 parts of p-dimethylaminobenzaldehyde, 60 parts of carbamic acid ethyl ester and 40 parts of conc. sulphuric acid are reacted, analogously to Example 12(a), initially with 200 parts benzene to the corresponding alkylidene urethane and then, after the addition of a further 10 parts of conc. sulphuric acid, in the way there described with 35 parts of styrene to give, after corresponding working up, 104 parts of the crude urethane with 8.3% N.

(b) 85 parts of the adduct described under (a) are heated for 4 hours at 230° C. with 200 parts of ethanol, 70 parts KOH and 100 parts of water, after cooling taken up with benzene and concentrated, whereby the crude amine is obtained in an amount of about 70 parts. This was taken up with conc. hydrochloric acid, organic impurities removed by shaking out with benzene and the hydrochloride concentrated on the water bath. There 83 parts of a semi-crystalline mass remain which melt at about 312° C. with decomposition.

Found 6.8% N, 17.05% Cl; for 1-phenyl-3-p-dimethylaminophenyl-1,3-diaminopropane trihydrochloride there is calculated 11.1% N and 28.1 Cl.

The infra-red spectrum of the salt is practically identical with the spectrum of the salt obtained according to Example 12(b). In the skeletal range of the spectrum, a few slight deviations occur.

*Example 14*

(a) 133 parts of benzal-diurethane, 200 parts of absolute benzene and 20 parts of $BF_3$-etherate are treated in an autoclave at 80° C. with 40 parts of isoprene by pumping in and heated for 4 hours at 150° C. The product is subsequently freed from acidic catalyst by treatment with sodium bicarbonate solution and distilled. Within the boiling range of 120–160° C./0.4 mm. Hg there is first obtained the crude urethane which, upon redistillation, yields 80 parts of 2-phenyl-4-methyl-1-carbethoxy-1,2,3,6-tetrahydropyridine of boiling point 136–138° C./0.3 mm. Hg, ($n_D^4$=1.5321).

Calc. for $C_{15}H_{19}NO_2$—Calc.: 73.5% C, 7.8% H, 5.7% N, 13.1% O. Found: 73.2% C, 8.0% H, 6.0% N.

(b) 49 parts of the 1-carbethoxy-2-phenyl-4-methyl-1,2,3,6-tetrahydropyridine produced according to (a) are heated for 4 hours at 230° C. in 50 parts of ethanol with 25 parts KOH and 50 parts of water, after cooling extracted with benzene and the organic phase distilled. The 2-phenyl-4-methyl-1,2,3,6-tetrahydropyridine thus obtained boils at 93° C./0.1 mm. Hg and has a refractive index of $n_D^{20}$=1.5519.

Calc.: $C_{12}H_{15}N$—83.1% C, 8.7% H, 8.1% N. Found: 83.1% C, 8.9% H, 7.8 N.

*Example 15*

(a) 190 parts of methylene-bisurethane, 350 parts of benzene and 40 parts of $BF_3$-etherate are mixed in an autoclave at room temperature with 140 parts of isoprene, heated to 150° C. within 3 hours and left for 6 hours at this temperature. After cooling, the mixture is freed from the acidic catalyst in the usual manner by treatment with bicarbonate solution, shaken out with benzene and distilled. Thereby there is obtained I, 105 parts of the crude 1-carbethoxy-4-methyl-1,2,5,6-tetrahydropyridine with a boiling point of 84–127° C./15 mm. Hg, as well as II, 31.5 parts of higher urethanes with a boiling point of 105–138° C./0.15 mm. Hg and a refractive index of $n_D^{20}$=1.4883, 64.7% C, 9.1% H and 7.9% N.

The redistillation of I yields the pure 1-carbethoxy-4-methyl-1,2,5,6-tetrahydropyridine with a boiling point of 118–122° C./20 mm. Hg and a $n_D^{20}$=1.4723.

Calc.: $C_9H_{15}NO_2$—63.9% C, 8.9% H, 8.3% N. Found—63.2% C, 8.9% H, 8.6% N.

(b) The urethane obtained according to (a) is saponified in an amount of 38 parts analogously to Example 14(b) with 30 parts KOH in 50 parts of water, taken up with ether and distilled. The still $H_2O$-containing crude 4-methyl-1,2,5,6-tetrahydropyridine is thereby obtained in an amount of about 15 parts with a boiling point of 53° C./15 mm. Hg and a refractive index of $n_D^{20}$=1.4598. $C_6H_{11}N$:

Calc.—74.3% C, 11.4% H, 14.4% N
Found: 71.7% C, 11.7% H, 11.6% N (c) 50 parts of the high molecular urethane II obtained according to (a) are heated in an autoclave for 4 hours at 230° C. with 50 parts of ethanol, 40 parts KOH and 40 parts of water. The residue is taken up in benzene, the benzene layer extracted with half concentrated HCl and the hydrochloric acid phase subsequently again rendered alkaline. After taking up in ether and drying over solid KOH, there are obtained 10 parts of an amine boiling at 90–130° C./18 mm. Hg with a refractive index of $n_D^{20}=1.4962$ and a nitrogen content of 10.3%. The infra-red spectrum for the amine clearly shows the frequencies ascribed to a primary aliphatic amine.

(d) 60 parts of the urethane obtained according to Example (a) are hydrogenated in 60 parts of methanol with pressure of 100 ats., subsequently filtered off from the catalyst and subjected to distillation. The 1-carbethoxy-4-methylpiperidine distills at 112° C./20 mm. Hg with a refractive index $n_D^{20}=1.4547$.

Calc. $C_9H_{17}NO_2$: 63.1% C, 10.0% H, 8.2% N. Found: 62.9% C, 10.0% H, 8.6% N.

By saponification of the urethane obtained according to Example 15(d) or by hydrogenation of the amine obtained according to 15(b), the known γ-pipecoline is obtained.

*Example 16*

208 parts of benzaldehyde-4-sulphonic acid sodium, 178 parts of carbamic acid ethyl ester and 400 parts of benzene are treated dropwise with 100 parts of conc. sulphuric acid and heated to boiling under reflux until the azeotropic splitting off of water hereby effected with the help of a water trap is ended and 104 parts of styrene subsequently added dropwise at 90° C. The mixture is maintained for 20 hours at 90° C., 1000 parts of water are added and the benzene phase separated off. The aqueous phase is immediately rendered neutral with half concentrated KOH and 220 parts KOH in 400 parts of water are then added. The mixture is heated for 4 hours in an autoclave to 230° C., concentrated and the salt of the free amine precipitated off, which is obtained in a yield of about 150 parts, by the addition of conc. HCl.

The infra-red spectrum of the salt is substantially identical with the spectrum of the dihydrochloride obtained according to Example 1(d). In addition, the bands at $12\mu$ ascribable to the p-substituted aromatic nucleus, as well as the very strong bands of the $SO_3H$ group, occur.

*Example 17*

(a) 151 parts of p-nitrobenzaldehyde, 178 parts of carbamic acid ethyl ester, 700 parts of benzene and 5 parts of $BF_3$-etherate are converted in the usual manner into the bis-urethane and, after the addition of a further 30 parts of $BF_3$-etherate, 104 parts of styrene are added dropwise at 90° C. The mixture is heated for 20 hours at 90° C. the acidic catalyst removed by treatment with dilute soda lye and the liquid components distilled off up to 140° C./2 mm. Hg. There is obtained as residue the crude urethane in a yield of 360 parts and a nitrogen content of 9.3%.

(b) 200 parts of the crude urethane produced according to (a), after the addition of 50 parts Raney nickel, are hydrogenated in 1.2 litres of ethanol up to 70° C. with 50 ats. hydrogen, subsequently filtered off from the catalyst and concentrated to a volume of 400 parts. 120 parts KOH in 200 parts water are then added and the product heated for 4 hours at 230° C. in an autoclave, after cooling, the greater part of the ethanol is distilled off and the free amine from the alkaline phase taken up with benzene. For purifying, the benzene phase is extracted with half concentrated hydrochloric acid and the hydrochloric acid phase subsequently again shaken up with benzene for the removal of organic soluble impurities. After concentration of the hydrochloric acid phase on the water bath, there is obtained the crude trihydrochloride in a yield of about 170 parts with a melting point of about 328° C. with decomposition.

Calc. $C_{15}H_{22}N_3Cl_3$: 12% N, 30.3% Cl. Found: 8% N, 20.6% Cl.

The infra-red spectrum of the salt is, with regard to the functional groups, identical with the dihydrochloride obtained according to Example 1(d). The bands of the p-substituted aromatic nucleus additionally occur at $12.15\mu$. Furthermore, the salt bands at $3.5\mu$ are broadened and split up by the different basicity of the amino groups. With regard to the position of the functional groups, the spectrum is identical with the infra red spectra of the salts obtained according to Examples 12(b) and 13(b).

*Example 18*

(a) 178 parts of carbamic acid ethyl ester, 136 parts of anisaldehyde, 5 parts of conc. sulphuric acid and 400 parts of benzene are converted into the bis-urethane by heating under reflux and azeotropic removal of the water split off and, after the addition of a further 25 parts of conc. sulphuric acid, 104 parts of styrene are added dropwise at 90° C. in 2 hours. The acidic catalyst is removed in the usual manner after 20 hours at 90° C. and, after concentration up to 160° C./12 mm. Hg, 321 parts of the crude urethane with 4.8% N are obtained.

(b) 312 parts of the urethane produced according to (a) are saponified with 275 parts of ethanol and 200 parts KOH in 200 parts water in an autoclave at 230° C. for 4 hours, the free amine taken up in benzene and subsequently isolated in the form of the hydrochloride by extraction with hydrochloric acid and concentration. M.P. 230–235° C. with decomposition.

Calc. $C_{16}H_{22}Cl_2N_2O$: 21.9% Cl, 8.5% N. Found: 20.3% Cl, 7.9% N.

The infra-red spectrum of the compound is, with regard to the functional groups, identical with the spectrum of the dihydrochloride obtained according to Example 1(d). The bands of the p-substituted aromatic nucleus additionally occur at $12.02\mu$ and, as expected, the bands of the aromatically bound methoxy group at $8\mu$.

*Example 19*

106 parts of pyridine-2-aldehyde and 178 parts of carbamic acid ethyl ester in 800 parts of benzene are slowly treated with 100 parts of conc. sulphuric acid and heated to boiling under reflux until the azeotropic splitting off of water hereby effected with the help of a water trap is ended. 50 parts of $BF_3$-etherate are then added, 104 parts of styrene added dropwise in 2 hours at 90° C., heated for 15 hours at about 90° C., 200 parts of water added and the reaction mixture neutralised with dilute soda lye at room temperature with stirring. Subsequently 300 parts of ethanol are added, as well as 440 parts 50% KOH and the mixture heated for 4 hours at 230° C. to saponify the urethane. The ethanol is subsequently distilled off, the residue taken up with benzene, extracted with half concentrated hydrochloric acid, rendered alkaline, the alkaline phase again shaken out with benzene and finally distilled. There is obtained within the boiling range 130–170° C./0.2 mm. Hg a total of 15 parts of a crude amine with 10.8% N and a refractive index of $n_D^{20}=1.5862$, the infra-red spectrum of which is fundamentally identical with the spectrum of the diamine obtained according to Example 1(b). Divisions in the bands between 6.7 and $7\mu$, as well as in the structural range between 9 and $10.5\mu$, are effected by the pyridine nucleus.

*Example 20*

(a) 97 parts of thiophene-2-aldehyde, 178 parts of carbamic acid ethyl ester, 500 parts of benzene and 5 parts of $BF_3$-etherate are converted in the usual manner into the bis-urethane and subsequently, after the addition of a further 50 parts of $BF_3$-etherate, condensed at 90° C. with 104 parts of styrene. After analogous working up, 124 parts of a semi-solid residue with 4.4% N and 9.1% S are obtained, whereas for a 1:1 adduct there is calculated 7.4% N and 8.5% S.

(b) 100 parts of the urethane obtained according to (a) are saponified in the usual way at 230° C. with 100 parts ethanol, 70 parts KOH and 80 parts of water and worked up as described above. The distillation of the crude amine yields about 2 parts of a distillate at 124° C./0.2 mm. Hg, the infra-red spectrum of which contains the bands of the functional groups analogous to the spectrum of the diamine obtained according to Example 1(b).

*Example 21*

(a) 178 parts of carbamic acid ethyl ester and 35 parts of paraformaldehyde are, with the use of 150 parts of benzene and 1 part of $BF_3$-etherate, converted in the usual manner into the methylene-bis-urethane, then 20 parts of $BF_3$-etherate and 1 part of tert.-butylpyrocatechol are added and 82 parts of 2,3-dimethylbutadiene-1,3 pumped into the autoclave at 150° C. The mixture is heated for 4 hours at 150° C., cooled and adjusted to a pH value of 7–8 with alkali lye and the organic phase shaken out several times with water. By the distillation of the benzene phase, a total of 96 parts of the crude 1-carbethoxy-3,3-dimethyl-1,2,5,6-tetrahydropyridine are obtained having a boiling point of 133–135° C./20 mm. Hg and a refractive index of $n_D^{20}=1.4761$.

Calc. $C_{10}H_{17}NO_2$: 65.5% C., 9.4% H, 7.6% N. Found: 64.3% C., 9.1% H, 8.4% N.

According to the infra-red spectrum, the product still contains small amounts of carbamic acid ethyl ester as impurity.

(b) 37 parts of the 1-carbethoxy-3,4-dimethyl-1,2,5,6-tetrahydropyridine produced according to Example 21(a) are heated for 4 hours at 230° C. with 20 parts of ethanol, 25 parts KOH and 50 parts $H_2O$ and, after the addition of cooking salt, directly shaken out with ether. After drying over solid KOH, the crude 3,4-dimethyl-1,2,5,6-tetrahydropyridine distills at 65–67° C./14 mm. Hg in a yield of 14 parts with a refractive index of $n_D^{20}=1.4735$.

Calc. $C_7H_{13}N$: 75.7% C., 11.8% H, 12.6% N. Found: 76.2% C., 12.1% H, 11.5% N.

*Example 22*

(a) Preparation of the addition compound: 95 parts of methylene-diurethane in 200 parts of absolute benzene are treated with 20 parts of boron trifluoride-etherate, and 50 parts of 1,2-dimethylenecyclohexane are then added at a temperature of 80° C. The reaction mixture is maintained at 80° C. for 4 hours, and is then refluxed for another 10 hours. The acidic catalyst and also the carbamic acid ethyl ester eliminated during the reaction are washed out by rinsing repeatedly with sodium bicarbonate solution and thereafter with water, and the product is distilled. 53 parts of a colourless compound having a refractive index of $n_D^{20}=1.4995$ distil at 96° C./0.1 mm. Hg, and according to analysis, infrared, and nuclear resonance spectra it constitutes the 2-carbethoxy-1,2,3,4,5,6,7,8-octahydro-isoquinoline.

(b) 21 parts of the urethane prepared in accordance with (a) are dissolved in 30 parts of ethanol, 20 parts of KOH in solution in 30 parts of water are then added, and the mixture is boiled under reflux for 10 hours, or instead heated at 230° C. for 4 hours in an autoclave. The free amine is extracted with ether from the strongly alkaline solution, and after being dried over solid KOH it is subjected to distillation. 1,2,3,4,5,6,7,8-octahydro isoquinoline having a boiling point of 100–102° C./14 mm. Hg, and a refractive index of $n_D^{20}=1.5075$ (all refractive indices were determined as $n_{20°}^D$)

in a yield of 10.5 parts is thereby obtained. The hydrochloride melts at 148–149° C., in agreement with the literature.

*Example 23*

(a) Preparation of the addition compound: By analogy with Example 22, 35 parts of methylenediurethane in 100 parts of absolute benzene are first treated with 10 parts of $BF_3$-etherate and then, at 70° C., with 25 parts of 1,1'-bicyclohexenyl. The mixture is maintained at 70° C. for 4 hours, and is then refluxed for another 10 hours. Working up is also carried out by analogy with Example 22. As reaction product, there are obtained 32 parts of a viscous, colourless oil which boils at 126–128° C./0.05 mm. Hg, exhibits a refractive index of $n_D^{20}=1.5191$, and is identical with 1,2,3,4,5,6,7,8,9,10,11,14-dodecahydro-9-carbethoxy-phenanthridine according to its properties.

(b) 12.5 parts of the urethane obtained according to Example 23(a) in 30 parts of ethanol and 30 parts of water are saponified with 12 parts of KOH under reflux or at 210° C. in an autoclave, by analogy with Example 22, and after being extracted with benzene, it is subjected to distillation. 1,2,3,4,5,6,7,8,9,10,11,14-dodecahydro-phenanthridine having

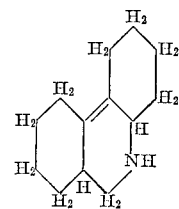

a boiling point of 155° C./18 mm. Hg, and a refractive index of $n_D^{20}=1.5322$, is obtained in a yield of 7 parts.

*Example 24*

(a) Preparation of the addition compound: 53 parts of benzaldehyde, 89 parts of carbamic acid ethyl ester, 250 parts of benzene, and 1 part of sulphuric acid are boiled under reflux with the use of a water trap for the purpose of separating the water which is formed. As soon as the separation of water has been completed, further 20 parts of $BF_3$-etherate are added, and 54 parts of 1,2-dimethylene-cyclohexane added dropwise at 80° C. Further processing and working up is carried out by analogy with Example 22. The reaction product is obtained in a yield of 55 parts with a boiling point of 147–150° C./0.07 mm. Hg and with a refractive index of $n_D^{20}=1.5442$. By virtue of the analysis and also of the spectra, the product is 3-phenyl-2-carbethoxy - 1,2,3,4,5,6,7,8 - octahydro-isoquinoline.

(b) 20 parts of the urethane according to Example 24(a) are saponified with 20 parts of KOH in 20 parts of water and 40 parts of ethanol by analogy with Example 22(b), and it is distilled after being extracted with ether and dried over KOH. 3-phenyl-1,2,3,4,5,6,7,8-octahydro-isoquinoline is obtained in a yield of 7.5 parts, with a boiling point of 7.5 parts of 113° C./0.07 mm. Hg and a refractive index of $n_D^{20}=1.5645$.

*Example 25*

(a) 1 mol of the corresponding aldehyde of one of the formulae as mentioned below together with 178 parts of carbamic acid ethyl ester and 2 parts of $BF_3$-etherate are reacted with 350 parts of benzene in a reflux condenser, until dehydration is finished. The reaction mixture is cooled to 70° C. and there are added 25 parts of $BF_3$-etherate. At 80° C. there are added dropwise 78 parts of isoprene during about 6 hours. The reaction is finished under reflux conditions during 10 hours. The benzenic solution is washed neutral after cooling with water, the product is isolated by distillation. Yield: about 40–75% of the theoretical.

(b) For the production of the free amine 1 mol of the urethane in parts by weight is dissolved in 200 parts by volume of ethanol, then there is added a solution of 130 parts by weight of KOH in 200 parts by volume of H₂O. The mixture then is heated in the autoclave to 230° C. for 4 hours, the greatest part of the alcohol is distilled off and the free amine is isolated by distillation. Yield of amine: 60–90% of the theoretical.

| Starting urethane | B.P. amine | $n_D^{20}$ of the amine resp., Fp of the derivative |
|---|---|---|
| 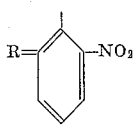 R / CH₃ | 90–105°/0.1 Torr | Phenylharnstoff, Fp=120°. |
| Cl | 98°/0.05 Torr | Phenylharnstoff, Fp=130–131°. |
| Cl—◯—Cl / Cl | 118–120°/0.06 Torr | |
| —◯—Cl / Cl | 137–140°/0.08 Torr | $n_{D20}$: 1.5749. |
| ◯— / OCH₃ | 103–105°/0.15 Torr | $n_D^{20}$:1.5572. |
| ◯— / Cl | 95–97°/0.07 Torr | $n_D^{20}$:1.5661. |

Example 26

170 parts by weight of the condensation product as described in Example 25(a) with

R=⟨◯⟩—NO₂ are dissolved in 250 parts by volume of ethanol and hydrogenated with 30 parts by weight of Raney-nickel at 50° and at a pressure of 100 atmospheres. Filtration from the catalyst is carried out and the mixture is concentrated in vacuum to 130° C., whereby a residue of 150 parts by weight is obtained. This residue (amino-urethane) is introduced into 150 parts by volume of ethanol and saponified with 100 parts by weight of KOH in 150 parts by weight of H₂O for 4 hours at 230° C. The mixture is agitated with benzene and after drying distilled over KOH. The 2-(o-aminophenyl)-4-methyl-1.2.3.6-tetrahydro-pyridine distills at 142–145° C./0.3 torr; $n_D^{20}$ 1.5815, in a gross yield of 64 parts by weight.

Example 27

Analog Example 26 the p-nitrophenyl-piperideine-urethane obtained as described in Example 25(a) with

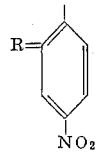

is hydrogenated and saponified. Thereby is obtained the 2-(p-aminophenyl)-4-methyl-1.2.3.6 - tetrahydro-pyridine in a yield of about 50% referring to the nitrobenzaldehyde; B.P. 126–140° C./0.08 torr, $n_D^{20}$ 1.5971.

Example 28

By carrying out a hydrogenation of the condensation product as described in Example 27 at 110° C./100 atmospheres H₂ with Ra-nickel, there is obtained in analogous saponification the 2-(p-aminophenyl)-4-methyl-piperideine with a B.P. of 132–134° C./0.06 torr, $n_D^{20}$ 1.5766. Yield 43%, referred to the p-nitrobenzaldehyde.

Example 29

15 parts by weight of the 2-carbethoxy-1.2.3.4.5.6.7.8-octahydro-isoquinoline as described in Example 24(a) are hydrogenated in 135 parts by volume of ethanol with 12 parts by weight of Ra-nickel at a temperature of 110° C. and a hydrogen pressure of 100 atmospheres. This solution is filtered and heated in the autoclave at 230° C. for 4 hours with a solution of 10 parts by weight of KOH in 20 parts by weight of H₂O. After extraction of the watery phase with ether there is obtained while distilling off the perhydroisoquinoline, especially in the cis-form; yield 85% of the theoretical.

Example 30

(a) A solution of 70 parts by weight of methylen-bis-urethane, 250 parts by weight of abs. benzene and 10 parts by weight of BF₃-etherate are treated dropwise with 54 parts by weight of 1-phenyl-butadiene at 60° C. This mixture is reacted for 4 hours at 80° C. and for 10 hours uder reflux conditions, washed neutral with H₂O and distilled off. Thereby is obtained the N-carbethoxy-2-phenyl-1.2.5.6-tetrahydropyridine of B.P. 110–112° C./0.08 torr, $n_D^{20}$ 1.5361, yield 45% of the theoretical.

(b) The saponification of the urethane is carried out as described in Example 25 and there is obtained a yield of 80% of the theoretical of the 2-phenyl-1.2.5.6-tetrahydropyridine, B.P. 62–70° C./0.12 torr, $n_D^{20}$ 1.5511.

I claim:
1. 2-phenyl-4-methyl-1,2,3,6-tetrahydropyridine.
2. A compound of the group consisting of the following substituted 1,2,3,6-tetrahydropyridines:
   (i) 2-phenyl-4-methyl-1,2,3,6-tetrahydropyridine,
   (ii) 2-(2-aminophenyl) - 4-methyl-1,2,3,6-tetrahydropyridine and
   (iii) 2-(4-aminophenyl) - 4-methyl-1,2,3,6-tetrahydropyridine.

References Cited by the Examiner

Kost et al.: Doklady Akad. Nauk. S.S.S.R., vol. 129 (1959), pages 1300–2.

McKay et al.: J. Amer. Chem. Soc., vol. 71 (1949), pages 766–70.

Samme: Chem. Abstr., vol. 53 (1959), col. 21, 596d (abstract of Ann. Chim. (Paris), vol. 2 (1957), pages 629–81.

Schmidle et al.: J. Amer. Soc., vol. 78 (1956), pages 1702–5.

Wawzonek et al.: J. Amer. Chem. Soc., vol. 74 (1952), pages 2894–6.

NICHOLAS S. RIZZO, *Primary Examiner.*

IRVING MARCUS, *Examiner.*